(12) United States Patent
Lee

(10) Patent No.: US 9,690,415 B2
(45) Date of Patent: Jun. 27, 2017

(54) TOUCH SCREEN DISPLAY DEVICE

(71) Applicant: Samsung Display Co., Ltd., Yongin, Gyeonggi-Do (KR)

(72) Inventor: Joo-Hyung Lee, Yongin (KR)

(73) Assignee: Samsung Display Co., Ltd. (KR)

( * ) Notice: Subject to any disclaimer, the term of this patent is extended or adjusted under 35 U.S.C. 154(b) by 288 days.

(21) Appl. No.: 14/040,347

(22) Filed: Sep. 27, 2013

(65) Prior Publication Data

US 2014/0347285 A1 Nov. 27, 2014

(30) Foreign Application Priority Data

May 24, 2013 (KR) ........................ 10-2013-0058859

(51) Int. Cl.
*G09G 5/00* (2006.01)
*G06F 3/041* (2006.01)
*G06F 1/32* (2006.01)

(52) U.S. Cl.
CPC .......... *G06F 3/0416* (2013.01); *G06F 1/3218* (2013.01)

(58) Field of Classification Search
CPC ........ G06F 3/041; G06F 3/044; G06F 3/0416; G06F 1/3218; G09G 5/00
USPC .......................................... 345/173–175, 206
See application file for complete search history.

(56) References Cited

U.S. PATENT DOCUMENTS

| 2008/0192038 | A1* | 8/2008 | Liu | ........................... | G09G 3/20 345/206 |
|---|---|---|---|---|---|
| 2012/0056834 | A1 | 3/2012 | Kim et al. | | |
| 2012/0319966 | A1* | 12/2012 | Reynolds | ................. | G06F 3/041 345/173 |
| 2013/0127779 | A1* | 5/2013 | Lillie | ..................... | G06F 3/0416 345/174 |
| 2013/0181943 | A1* | 7/2013 | Bulea | ....................... | G06F 3/044 345/174 |
| 2014/0002410 | A1* | 1/2014 | Lillie | ..................... | G06F 3/041 345/174 |
| 2014/0236728 | A1* | 8/2014 | Wright | ............... | G06Q 30/0272 705/14.58 |

FOREIGN PATENT DOCUMENTS

KR 1020110064181 A 6/2011
KR 10-2012-0025323 3/2012

* cited by examiner

*Primary Examiner* — Adam R Giesy
(74) *Attorney, Agent, or Firm* — Innovation Counsel LLP

(57) ABSTRACT

Rather than crowding all functionalities into a single monolithically integrated circuit and thus causing concentration of power dissipation, there is provided a touch screen display device in which a multifunctional smart IC is separated from a simplified display driver circuit. The smart IC includes a logic unit for driving a touch screen panel and a logic unit for driving a display panel. The touch screen display device includes not only the touch screen panel, the display panel, the simplified display driver circuit and the smart IC but may further optionally include a controllable power supply that is controlled by the smart IC. The smart IC includes a first logic unit for driving the touch screen panel and a second logic unit for driving the display panel. The display driver circuit is coupled to receive pre-processed display data and a driving synchronization signal from the second logic unit of the smart IC.

11 Claims, 3 Drawing Sheets

TOUCH SCREEN DISPLAY DEVICE

CROSS-REFERENCE TO RELATED APPLICATION

This application claims priority to and the benefit of Korean Patent Application No. 10-2013-0058859, filed on May 24, 2013, in the Korean Intellectual Property Office, the entire content of which application is incorporated herein by reference.

BACKGROUND

1. Field

The present disclosure of invention relates to a touch screen display device.

2. Description of Related Technology

A touch screen panel is an input device capable of detecting on screen areas touched or pointed at by a human finger and/or another touching/pointing device where the touched or pointed-to one or more on screen areas are indicative of an input or a command desired by the user.

The touch screen panel is provided on a front face of the display panel to detect the position of the contacted or pointed-to on screen area(s) and to produce position data signals identifying the contacted or pointed-to on screen area(s). Therefore, the location indication(s) selected by the contacted position(s) is produced as an input signal for processing by one or more data processors that are programmed to respond to such a one or more contacts.

An advantage of the touch screen panel is that it eliminates need for an additional surface interface input device connected to a display device such as a keyboard or a mouse. Popularity of the touch screen approach is increasing.

Unfortunately as popularity of the touch screen approach increases, so too do the data processing demands placed on the circuitry that supports integrated functionalities of display driving and touch layer driving. Conventionally these are all squeezed into a single monolithically integrated circuit (IC) and as a result power and heat dissipation are concentrated into the one IC and mass production yield of the one IC may decrease as its internal complexity increases (e.g., squeezing into the one IC mixed signal processing requirements including that of high voltage analog processing and low voltage, high frequency digital processing).

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Rather than crowding all functionalities into a single monolithically integrated circuit and thus causing concentration of power dissipation, there is provided a touch-responsive and image displaying device in which a multi-functional smart IC is separated thermally and in terms of mass production fabrication from a simplified display driver circuit. The smart IC includes a logic unit for driving a touch screen panel and a logic unit for driving a display panel. The touch-responsive and image displaying device includes not only the touch screen panel, the display panel, the simplified display driver circuit and the smart IC but may further optionally include a controllable power supply that is controlled by the smart IC. The smart IC includes a first logic unit for driving and/or controlling the touch screen panel and a second logic unit for driving and/or controlling the display panel. The simplified display driver circuit is coupled to receive pre-processed display data and a driving synchronization signal from the second logic unit of the smart IC and is configured to accordingly drive the display panel.

More specifically, embodiments of the present disclosure of invention provide a touch screen display device in which a multifunctional smart integrated chip (IC) including a logic unit for driving a touch screen panel and a logic unit for driving a display panel is mounted to reduce concentration of power consumption and to prevent excessive heat generation.

In order to achieve the foregoing and/or other aspects of the present teachings, there is provided in one embodiment, a touch screen display device, including a touch screen panel and a display panel, a smart IC including a first logic unit for driving the touch screen panel and a second logic unit for driving the display panel, and a display driver for receiving display data and a driving signal from the second logic unit to drive the display panel.

The smart IC may include a receiving unit and a transmitting unit for receiving and transmitting a touch signal or a display signal, a memory unit including at least one memory of a first memory for storing the display data and a second memory used by at least one logic unit of the first and second logic units, and a touch processor for processing at least the touch signal.

The smart IC may be a memory built-in type IC where the first and second logic units and the memory unit are mounted in the same chip and may be a multichip package type IC including a chip in which the first and second logic units are mounted and a chip in which the memory unit is mounted.

The touch processor may be realized by a touch/display multiprocessor driven in a time-division method of processing the touch signal in a first period and processing the display signal in a second period different from the first period.

The display driver may include a timing controller (primary TC) for receiving the display data and the driving signal from the smart IC and driving the display panel to correspond to the display data and the driving signal.

The display driver may further include at least one analog part such as a digital to analog signal converter (DAC).

The second logic unit may include at least one member of a group comprising an algorithm and a gamma circuit for processing the display signal.

The second logic unit may include at least one member of a group comprising an algorithm for digital driving and an algorithm for improving picture quality.

The first logic unit may include an algorithm for processing the touch signal.

The touch screen display device may further include an application processor for bilaterally transmitting data to and receiving data from the smart IC. The display driver may be connected to the application processor via the smart IC.

The application processor may receive the processed touch signal from the smart IC and may supply the display signal to the smart IC.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the present teachings to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Hereinafter, embodiments in accordance with the present disclosure of invention will be described in greater detail with reference to the accompanying drawings.

Figure 1:
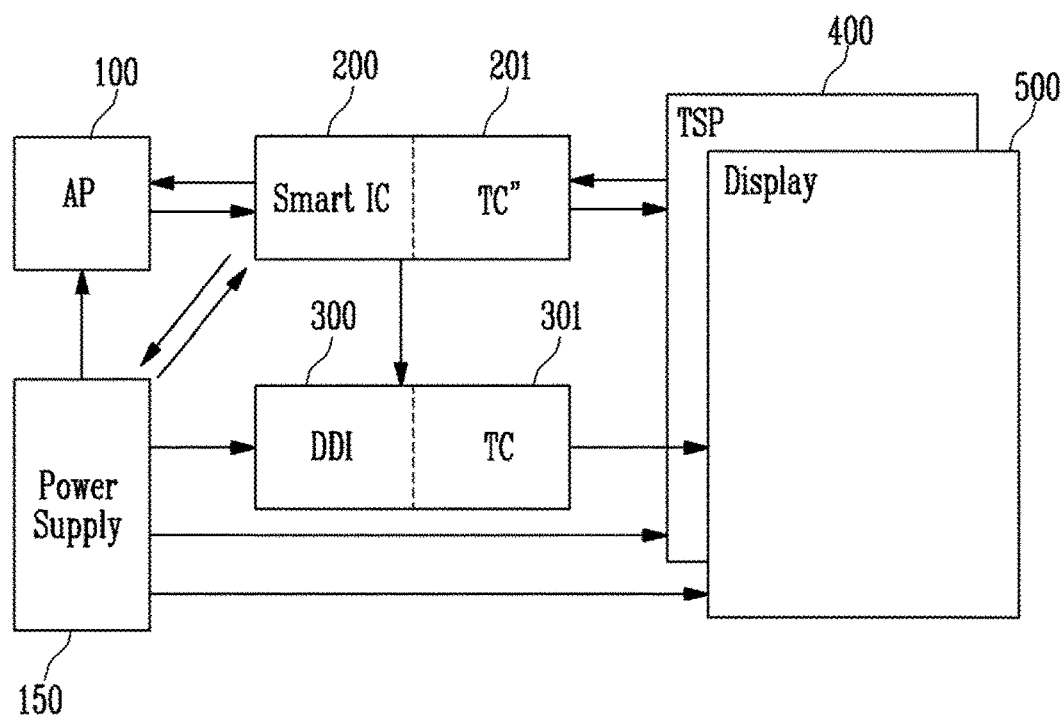
FIG. 1 is a schematic diagram illustrating a touch screen display device according to an embodiment of the present disclosure that provides a monolithically integrated circuit configured for smartly interfacing with touch screen panels and display drivers.

FIG. 1 is a schematic diagram illustrating a touch screen display device according to an embodiment of the disclosure.

Referring to FIG. 1, a touch screen display device according to the illustrated embodiment includes an application processor 100, a smart and monolithically integrated circuit (IC) 200 configured at least for bilaterally communicating with the application processor 100. The touch screen display device further includes a display driver (for example, a display driving IC (DDI)) 300 for receiving display data from the smart IC 200 and for generating driving signals for an included display panel 500. The touch screen display device yet further includes a touch screen panel 400 driven by the smart IC 200. The display panel 500, as mentioned, is driven by the display driver 300 where the latter is controlled by the smart IC 200. Additionally, the touch screen display device includes one or more power supply units (collectively shown as 150) configured for producing appropriate power supply voltage levels for powering the various other units. In the case of some displays (e.g., LCD type displays) this may include producing high voltage power supply levels for driving pixel components and lower voltage power supply levels for driving digital logic circuitry.

In the illustrated embodiment of FIG. 1, the smart IC 200 is distinctly situated at least thermally speaking from the display driving IC (DDI)) 300 so that heat produced by the respective IC's is not concentrated in one spot and thus may be more easily dissipated to the surround while temperatures inside the respective two IC's 200 and 300 can be kept lower than otherwise would be if the functionalities of both of the two IC's 200 and 300 were encapsulated in a single monolithically integrated circuit. In one embodiment, the two IC's 200 and 300 are physically spaced apart from one another.

Additionally, in one embodiment, only the display driving IC (DDI)) 300 receives high voltage power supply signals from the power supply(/-ies) 150 while the smart IC 200 does not receive such high voltage power supply signals and instead operates using power supply signals of lower voltage magnitudes (e.g., only digital logic level power supply signals). If the touch screen panel 400 requires higher levels of voltage, these may be independently supplied from the power supply(/-ies) 150 to the touch screen panel 400 rather than being channeled through the smart IC 200. In one embodiment, the smart IC 200 controls when and how the power supply(/-ies) 150 distribute appropriate power levels to the various other components so that, and merely by way of example, if and when the touch screen panel 400 does not need to be powered up (e.g., because the AP 100 will not be responding to touch signals at that time), the smart IC 200 can command the power supply(/-ies) 150 to provide no or reduced power levels to the TSP 400.

In terms of more details, the application processor (AP) 100 may receive a touch signal processed by and produced by the smart IC 200 in response to the smart IC 200 recognizing a corresponding touch input as reported by the TSP 400 to the smart IC 200. In response to the received touch signal, the application processor 100 supplies a corresponding display signal to the smart IC 200. Here, the display signal may include display data, various driving control signals, and/or power supply signals or power supply control signals for driving the display panel 500. That is, the application processor 100 bilaterally transmits data to and receives data from the smart IC 200 so that the touch screen panel 400 and the display panel 500 are driven (or not driven, or not fully driven; e.g., placed in temporary sleep and/or not-scanned modes) in accordance with application level control signals produced by the application processor 100 and thereafter processed by the smart IC 200 as an intermediary.

Figure 2:
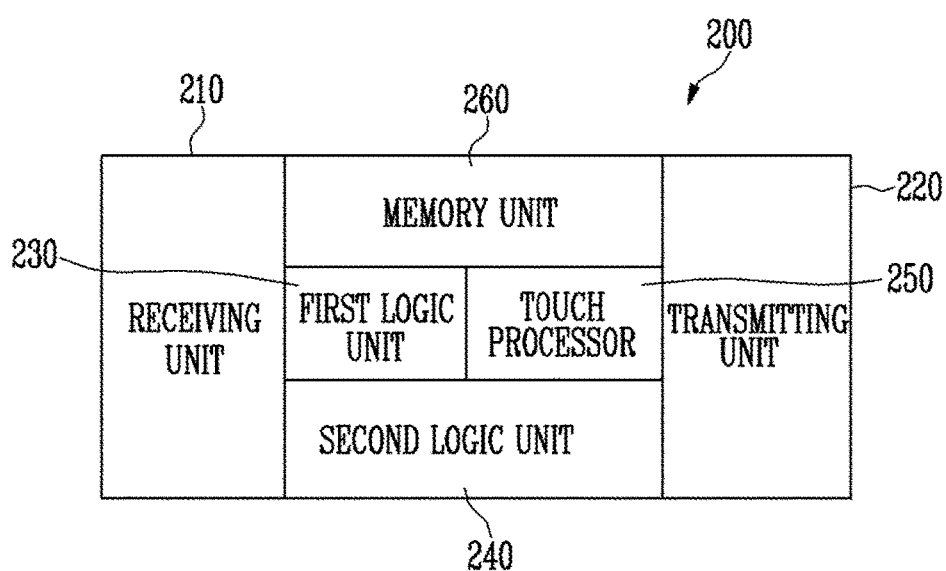
FIG. 2 is a view illustrating an example of the monolithically integrated (and hereafter also "smart") integrated circuit (IC) illustrated in FIG. 1.

Referring to FIG. 2, the smart IC 200 includes within its integrated packaging, a first logic unit 230 configured for interfacing with the touch screen panel 400 by use of digital logic signals and a second logic unit 240 configured for interfacing with the DDI 300 by use of digital logic signals and thus driving the display panel 500 where the DDI 300 but not the smart IC 200 receives high voltage power signals (if any) which are needed for driving the display panel 500. In other words, the smart IC 200 is configured to be multifunctional and to operate with mostly digital control signals rather than requiring a mixed signal capability including that of channeling high voltage power supply levels through the smart IC 200. That is, according to the present teachings, the smart IC 200 is configured to include digitally-executable algorithms for appropriately interfacing with driving the touch screen panel 400 and appropriately interfacing with the display panel 500 indirectly by way of the display driving IC (DDI)) 300. In addition, the smart IC 200 may further include a memory 260 used by the first logic unit 230 for driving the touch screen panel 400 and/or by the second logic unit 240 for driving the display panel 500 and/or a memory (e.g., frame buffer) adapted for storing display data. In other words, the memory 260 may include a nonvolatile storage section such as flash memory for storing operational algorithms and a volatile storage section such as SRAM for storing image data.

That is, in the smart IC 200, the first logic unit 230 for driving the touch screen panel 400 and the second logic unit 240 for driving the display panel 500 are integrally provided and the memory 260 as required by one or both of the integrated first and second logic units is also provided such that the smart IC 200 provides an integrated solution for the needs of different combinations of the three interlinked devices, namely, the AP 100, the TSP 400 and the display 500.

As described above, when the first logic unit for driving the touch screen panel 400 and the second logic unit for driving the display panel 500 and/or the memory are provided in the smart IC 200, concentration of power consumption of a main board including the application processor 100 may be reduced or minimized so that heat produced from consumed power can be more easily dissipated and so that power is not wasted due to unsynchronized allocation of full power portion of the system that may not always need full power. An internal structure of the smart IC 200 will be described in greater detail later below.

The display driver 300 receives the display data and the driving control signals from the second logic unit 240 of the smart IC 200 to drive the display panel 500. That is, according to the illustrated embodiment of FIG. 1, the display driver 300 may be indirectly connected to the application processor 100 while having the smart IC 200 serving as an intermediary instead of receiving display control and data signals directly from the application processor 100. In this case, the display driver 300 receives the display signal (for example, the display data and the driving signal) as pre-processed by the smart IC 200 and may be driven by the pre-processed display signals.

The display driver 300 includes a timing controller (TC) for receiving the display data and the driving control signals from the smart IC 200 and for driving the display panel 500 to correspond to the display data and the driving signals output by the AP 100. In addition, the display driver 300 may selectively further include one or more analog parts that for example output analog data line drive signals for data lines of the display panel 500 and that for example output high voltage gate line drive signals for gate lines of the display panel 500.

According to the present disclosure of invention, at least parts of various digital signal processing operations that would otherwise have been carried out inside the display driving IC (DDI)) 300 for processing the high level display control signals supplied by the application processor 100 are off loaded to instead by carried out in the smart IC 200 so that the localized power consumption of the display driver 300 is reduced.

That is, the signal processing algorithms for processing the display signal may be separated from the display driver 300 in which the timing controller is mounted so as to be instead provided in the spaced apart smart IC 200. In addition, the memory storage capacities required by the signal processing algorithms and/or the memory storage capacities required for storing the signal processed display data may be provided in the smart IC 200 rather than all inside the display driver 300. Therefore, the die size of the display driver 300 may be reduced and mass production yield thereof may be increased. Additionally, heat loss is dispersed so that excessive heat generation within a single driving unit may be prevented.

The touch screen panel 400 includes sensing electrodes (not shown) for sensing a touch input of a user. The touch screen panel 400 may receive a touch driving signal such as a Tx row and/or column scan driving signal from the smart IC 200 and may transmit an Rx touch sensing signal to the smart IC 200. Then, the smart IC 200 processes the touch sensing signal to transmit the processed touch sensing signal to the application processor 100 so that the touch input is sensed. On the other hand, the above is only an embodiment for describing a driving principle of the touch screen panel 400 and the present disclosure of invention is not limited thereto. A structure and a driving method of the touch screen panel 400 may have various modifications in accordance with various driving methods such as a resistance layer method, a photo-sensing method, and an electro-capacitive method. In many of these various techniques, rows and/or columns of the TSP are periodically scanned whereby the scanning operation consumes power. At the same time, the scanning of gate lines in the display device 500 also consumes power. In considering both of these and noting from FIG. 1 that the TSP scanning is activated from the smart IC 200 while the display device scanning is activated from the DDI 300, it may be appreciated that the corresponding power consumptions are distributed rather than concentrated in a single monolithically integrated circuit. In one embodiment, the smart IC 200 may be considered to include a secondary timing controller TC" (201) for coordinating timed operations of the TSP 400 while the display driving IC (DDI)) 300 is considered to include a primary timing controller TC (301) for coordinating timed operations of the display panel 500.

The display panel 500 includes a plurality of pixels (not shown) driven to correspond to the display data and the driving signal received from the display driver 300. Therefore, the display panel 500 displays an image corresponding to the display data. The display panel 500 may be realized by an organic electroluminescence display panel (e.g., OLED) or a liquid crystal display (LCD) panel. As mentioned above, these various display technologies typically require periodic scanning of rows and/or columns thereof and the scanning operation consumes power.

On the other hand, in FIG. 1, in order to clarify elements of the present disclosure of invention, the touch screen panel 400 and the display panel 500 are illustrated as separate elements. However, the present disclosure is not limited to the above arrangement. That is, the touch screen panel 400 and the display panel 500 may be separately provided to be combined with each other as illustrated in FIG. 1 or they may be integrated with each other as respective layers in one panel or even as intermingled functionalities within basically a same layer.

As described above, the touch screen display device according to the embodiment of the present disclosure includes the multifunctional smart IC 200 that includes the first logic unit 230 for driving the touch screen panel 400 and the second logic unit 240 for driving the display panel 500 and that may further include the memory 260. The touch screen display device further includes the separate display driver 300 for receiving the display data and the driving signal from the second logic unit of the smart IC 200 to drive the display panel 500.

That is, the second logic unit 240 for driving the display panel 500 is integrated in a same monolithically integrated circuit 200 with the first logic unit 230 for driving the touch screen panel (TSP) 400 and these logic circuits are separated from the display driver 300 including the timing controller such that heat dissipation from the respective parts is dispersed rather than being concentrated. In this case, since the display driver 300 is simply realized so that only the timing controller and other analog parts are mounted therein, the die size of the display driver 300 may be reduced and mass production yield thereof may be increased. The second logic unit 240 for processing the display signal is integrated with the first logic unit 230 for processing the touch signal in the smart IC 200. As such an additional part mounting area is not needed for separately accommodating these low voltage digital signal processing parts.

According to the embodiment of the present disclosure, the power consumption of the main board including the application processor 100 is distributed and may optionally be reduced or minimized by way of smart power distribution so that unnecessary power consumption may be avoided and concentrated heat generation within the driving unit may be prevented. Therefore, the embodiment of the present disclosure may be usefully applied to a product that adopts a new driving technology such as a digital driving technology and/or a compensating circuit for compensating for Mura artifacts or the like. In particular, the embodiment of the present disclosure may be usefully applied to an ultra high resolution products with relatively high driving frequencies (e.g., row scan frequencies) where such relatively high driving frequencies generally cause increased power consumption and a need for better heat dissipation.

Figure 3:
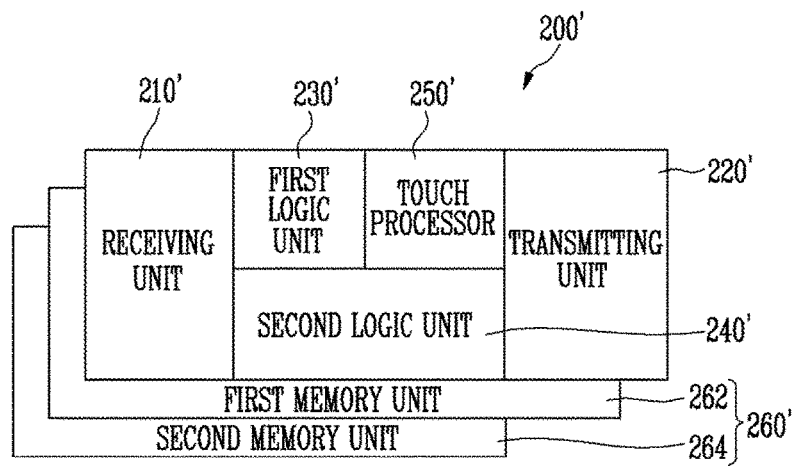
FIG. 3 is a view illustrating another example of a smart integrated circuit (IC) in accordance with the present disclosure.

FIG. 2 is a schematic diagram illustrating an example of the smart IC illustrated in FIG. 1. FIG. 3 is a schematic diagram illustrating another example of the smart IC illustrated in FIG. 1.

Referring to FIG. 2, the smart IC 200 according to the illustrated embodiment includes a signals receiving unit 210, a signals transmitting unit 220, a first digital logic processing unit 230, a second digital logic processing unit 240, a touch processor 250, and a memory unit 260.

The receiving unit 210 receives one or more touch indicating signals from the touch screen panel (TSP) 400 and one or more display data or control signals from the application processor (AP) 100.

The transmitting unit 220 outputs corresponding, post-processing touch signals processed by the smart IC 200 to the application processor 100 or outputs the touch driving signals (e.g., sensor scanning signals) to the touch screen panel 400. In addition, the transmitting unit 220 may transmit display control and/or image data signals that have been pre-processed by the smart IC 200 to the display driver 300. The pre-processing of the image data signals may include, but is not limited to, gamut remapping RGB to RGBW), subpixel rendering (SPR), edge or line contrast sharpenings and so on.

On the other hand, for convenience sake, in FIG. 2, the receiving unit 210 and the transmitting unit 220 for transmitting the touch signal or the display signal are illustrated. However, the present disclosure of invention is not necessarily limited to the above. For example, the touch signal transmitting and receiving units and the display signal transmitting and receiving units may be separated.

The first logic unit 230 for driving the touch screen panel 400 may include one or more algorithm for processing the touch signals received from the TSP 400.

The second logic unit 240 for driving the display panel 500 may include one or more algorithm and/or gamma correction or conversion circuits for pre-processing the display signals before they are forwarded to the DDI 300. The second logic unit 240 may further include an algorithm for digital driving and an algorithm for compensating for picture quality such as reducing Mura effects. In particular, according to the embodiment of the present disclosure of invention, since the second logic unit 240 is separated from the timing controller (TC) provided in the display driver 300, heat generation from these respective parts is dispersed and design limitations on the algorithm that may be included in the second logic unit 240 are relatively small.

The touch processor 250 processes the touch signal such as the touch sensing signal and/or the touch driving signal.

The touch processor 250 may be realized by, for example, in the form a novolatily re-programmable ARM processor.

The memory unit 260 may include at least one memory of the memory used by the first logic unit 230 and/or the second logic unit 240 and the memory for storing the display data signal processed by the second logic unit 240. For this purpose, the memory unit 260 may include, for example, a plurality of different kinds of memories and the memories may be realized by for example, static and/or dynamic random access memories (RAM) or nonvolatile reprogrammable flash memories and/or once programmable read-only memories (ROM).

The smart IC 200 according to the present embodiment may be realized in a memory built-in type where the first and second logic units 230 and 240 and the memory unit 260 are mounted in the same chip.

The smart IC 200 according to the present disclosure is not limited to that realized in the memory built-in type as illustrated in FIG. 2. For example, as illustrated in FIG. 3, a smart IC 200' may be realized in a multichip single package type.

Referring to FIG. 3, In an alternate embodiment, the smart IC circuitry 200' may be realized as a plurality of monolithically integrated circuit chips housed in the multichip package, where the plural chips include a first chip in which a receiving unit 210', a transmitting unit 220', a first logic unit 230', a second logic unit 240', and a touch processor 250' are mounted and one or more additional chips in which the whole or respective parts of memory unit 260' are disposed.

More specifically, the memory unit 260' that may be provided in at least one chip, may be divided into a first memory unit 262 and a second memory unit 264 to be provided in the plurality of chips so that the memory unit 260' may secure more memory capacity. For example, one of the chips may be configured as a high density SRAM or DRAM chip while the other is configured as a high density Flash memory chip.

As described above, the smart ICs 200 and 200' according to the embodiments of FIGS. 2 and 3 are realized so that the first logic unit 230 for processing the touch signal and the second logic unit 240 for processing the display signal are integrated with each other to be provided in the smart IC 200 or smart IC multi-chip housing 200'. The smart ICs 200 and 200' may further include the memory units 260 and 260' including the memory referred to by the first and second logic units 230, 230', 240, and 240' or the memory for storing the display data. Therefore, the power consumption of the system may be more uniformly dispersed rather than being concentrated and a structure of the display driver 300 may be simplified (e.g., its die size reduced) so that the concentrated heat generation of the driving unit may be prevented and so that mass production yield of the display driver 300 may be increased.

Figure 4:
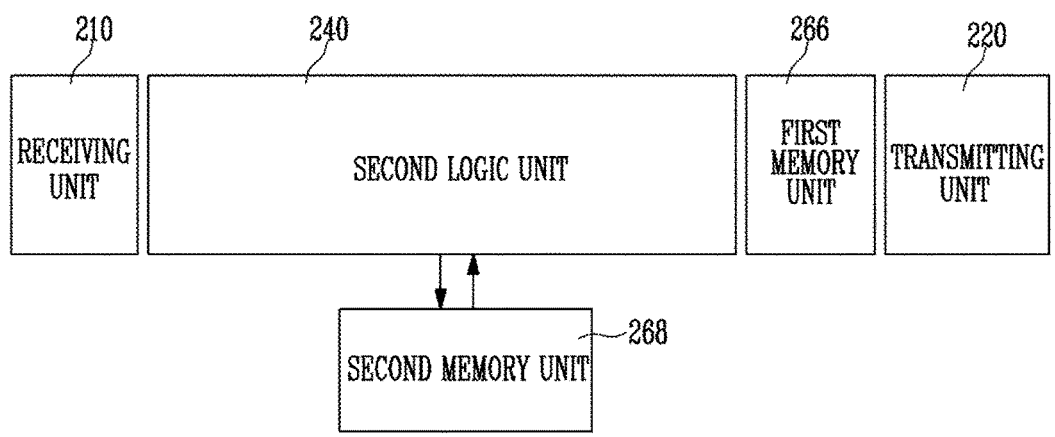
FIG. 4 is a view illustrating an example of elements provided in a smart IC for processing a display signal.

FIG. 4 is a schematic diagram illustrating an example of elements provided in a smart IC for processing a display signal.

Processes in which the display signal is processed in the smart IC will be described with reference to FIG. 4. The display signal from the outside (for example, from the application processor) is received by the receiving unit 210 to be processed by various algorithms stored and/or provided as firmware in the second logic unit 240.

In particular, in the case of ultra high resolution image display, the second logic unit 240 may include various algorithms such as the algorithm for digital driving and/or the algorithm for compensating for picture quality such as avoiding Mura effects. At this time, a second memory 268, if needed for operating the second logic unit 240 may be provided in the smart IC.

The processed display signal, for example, the display data is transmitted by the transmitting unit 220 to the outside (for example, to the display driver) after being buffered in the first memory unit 266.

The first and second memory units 266 and 268 used for processing the display signal may be provided in the memory unit 260 illustrated in FIG. 2 or the first and/or second memory units 262 and 264 illustrated in FIG. 3.

On the other hand, the touch processors 250 and 250' illustrated in FIGS. 2 and 3 may be realized to perform signal processing in at least parts of the signal processing processes of the display signal, which will be described in detail with reference to FIG. 5.

Figure 5:
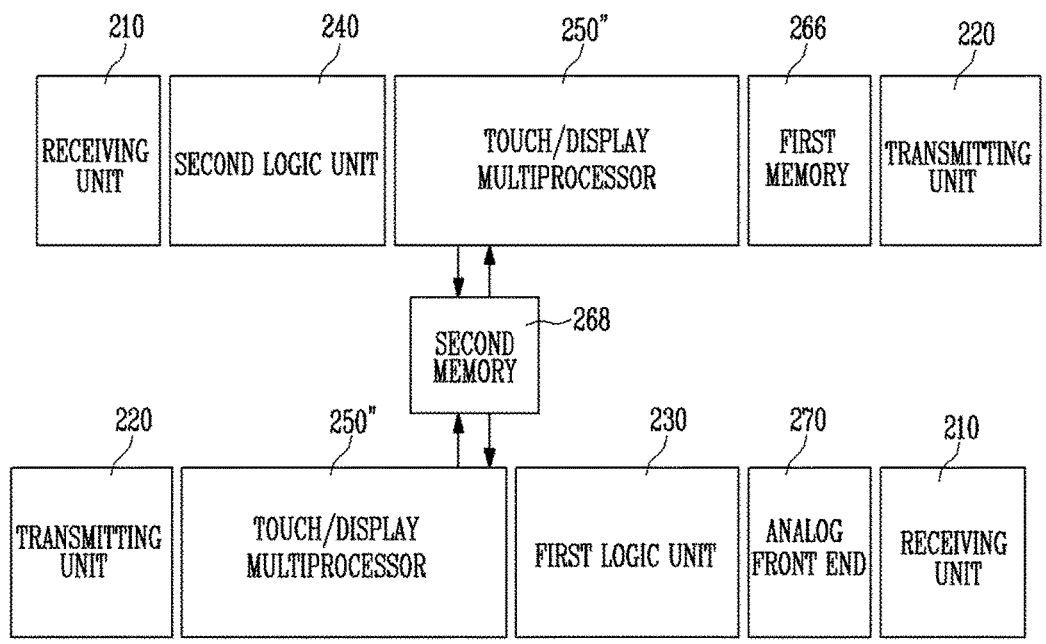
FIG. 5 is a view illustrating an example of elements provided in a smart IC for processing a display signal and a touch signal.

FIG. 5 is a schematic diagram illustrating an example of elements provided in a smart IC for processing both of a display signal and a touch signal. In the embodiment illustrated in FIG. 5, a function of the touch processor is not limited to processing the touch signal. For example, the touch processor may be realized by a touch/display multiprocessor that may process both the touch signal and the display signal. In other words, multi-purpose data processing resources 250" may be utilized as and when needed for the respective processings of touch-related signals, display-related signals and/or other signals. For convenience sake, in describing FIG. 5, detailed description of parts the same as or similar to those of FIG. 4 will be omitted.

First, referring to FIG. 5, the processes in which the display signal is processed in the smart IC will be described. The display signal is received by the receiving unit 210 to be processed via the second logic unit 240 and a touch/display multiprocessor 250". That is, the touch/display multiprocessor 250" performs at least partial signal processing processes in processing the display signal. In the processes, the touch/display multiprocessor 250" may refer to the second memory 268. The processed display signal, for example, the display data is transmitted by the transmitting unit 220 to the outside via the first memory 266 (output buffering memory).

On the other hand, the touch/display multiprocessor 250" is also used, when image processing does not take priority; for processing the touch-related signals. For example, the touch/display multiprocessor 250" may be used for performing various algorithms for processing the touch signal or initializing registers.

At this time, the touch/display multiprocessor 250" may be driven in a time-division multiplexing method to be used for processing both the touch signal and the display signal. That is, the touch/display multiprocessor 250" may process the touch signal in a first period and may process the display signal in a second period different from the first period.

Hereinafter, processes in which the touch signal is processed in the smart IC will be described. For convenience sake, it is assumed that the touch signal is the touch sensing signal input from the touch screen panel. First, the touch sensing signal is received by the receiving unit 210 and is processed by the touch/display multiprocessor 250" to be transmitted by the transmitting unit 220 to the outside such as to the application processor 100. At this time, the touch/display multiprocessor 250" may refer to the second memory 268 in processing the touch signal.

On the other hand, an analog front end (AFE, including an analog to digital converter or ADC—not shown) 270 may be provided between the receiving unit 210 and the first logic unit 230. In this case, the touch sensing signal may be transmitted from the receiving unit 210 to the first logic unit 230 via the AFE 270.

As described above, according to the present embodiment, the programmable touch processor may be realized by the touch/display multiprocessor 250" used for processing the touch signal. In this case, a new function may be easily added without mounting an additional part and a product with a simplified interface with the application processor may be developed.

By way of summation and review, the touch screen display device including the touch screen panel includes the touch screen panel, the display panel, the touch IC for driving the touch screen panel, and the display driver (for example, the display driving IC) for driving the display panel.

On the other hand, in various display devices including a mobile display device, power consumption is an important factor in consumers selecting products. Therefore, it is desirable to reduce power consumption in such devices. This can be done by tasking the smart IC 200 (or 200') with managing power distribution to the various components on an as needed (or not needed) basis, thereby avoiding unnecessary consumptions of power.

In addition, as a technology of the display device is developed, in order to improve resolution and a driving speed, a new driving technology or compensating circuit is adopted. However, heat generation of the display driver may be caused.

The touch screen display device according to the embodiment of the present disclosure of invention includes the logic unit for driving the display panel integrated with the logic unit for driving the touch screen panel in the smart IC. That is, the logic unit for driving the display panel is separated from the display driver including the timing controller. Therefore, the power consumption may be reduced and/or redistributed for easier dissipation of the consequential heat and concentration of the heat generation of the driving unit may be prevented.

Additionally, in the touch screen display device according to the embodiment of the present disclosure of invention, the programmable touch processor may be realized by the touch/display multiprocessor used for processing the display signal. In this case, a new function may be easily added without mounting an additional part and a product with a simplified interface with the application processor may be developed.

Example embodiments have been disclosed herein, and although specific terms are employed, they are used and are to be interpreted in a generic and descriptive sense only and not for purpose of limitation. In some instances, as would be apparent to one of ordinary skill in the art in view of the foregoing and as of the filing of the present application, features, characteristics, and/or elements described in connection with particular embodiments may be used singly or in combination with features, characteristics, and/or elements described in connection with other embodiments unless otherwise specifically indicated herein. Accordingly, it will be understood by those of skill in the art that various changes in form and details may be made without departing from the spirit and scope of the present teachings.

What is claimed is:

1. A touch-responsive and image displaying device, comprising:
   a touch screen panel or layer;
   a display panel or layer;

a smart IC including a first logic unit configured to control and/or drive the touch screen panel/layer and a second logic unit configured to control and/or drive the display panel/layer;

a display driver which is thermally distanced from the smart IC and is configured to receive from the second logic unit, processed display data that has been processed by the second logic unit, the display driver being configured to also receive from the second logic unit, a driving signal for synchronizing driving of the display panel;

an application processor for bilaterally transmitting data to and receiving data from the smart IC, wherein the display driver is only connected to the application processor indirectly by way of the smart IC such that control signals for driving the display panel produced by the application processor are processed by the smart IC as an intermediary; and a power supply unit configured to provide high voltage power supply signals for driving the display panel, wherein the smart IC is configured to control the power supply unit to provide the high voltage power supply signals to the display driver without channeling the high voltage power supply signals through the smart IC.

2. The device of claim 1, wherein the smart IC comprises:

a receiving unit and a transmitting unit configured to respectively receive and to transmit a touch signal or a display signal;

a memory unit including at least one memory of a first memory kind configured to store the display data and a second memory used by at least one logic unit of the first and second logic units; and a touch processor for processing at least the touch signal.

3. The device of claim 2, wherein the smart IC is a memory built-in type IC where the first and second logic units and the memory unit are disposed in a same monolithically integrated chip.

4. The device of claim 2, wherein the smart IC is a multichip package type IC including a chip in which the first and second logic units are mounted and a chip in which the memory unit is mounted.

5. The device of claim 2, wherein the touch processor is realized by a touch/display multiprocessor driven in a time-division method of processing the touch signal in a first period and processing the display signal in a second period different from the first period.

6. The device of claim 1, wherein the display driver comprises a timing controller for receiving the processed display data and the driving signal from the smart IC and driving the display panel to correspond to the processed display data and the driving signal.

7. The device of claim 6, wherein the display driver further comprises at least one analog part.

8. The device of claim 1, wherein the second logic unit comprises at least one of an algorithm and a gamma circuit configured to process the display signal.

9. The device of claim 1, wherein the second logic unit comprises at least one algorithm of a group including an algorithm for digital driving and an algorithm for improving picture quality.

10. The device of claim 1, wherein the first logic unit comprises an algorithm configured to process the touch signal.

11. The device of claim 1, wherein the application processor receives the processed touch signal from the smart IC and supplies the display signal to the smart IC.

* * * * *